(No Model.) 2 Sheets—Sheet 1.
A. LA BONTÉ.
WELT TURNING AND INSEAM TRIMMING MACHINE.
No. 558,286. Patented Apr. 14, 1896.
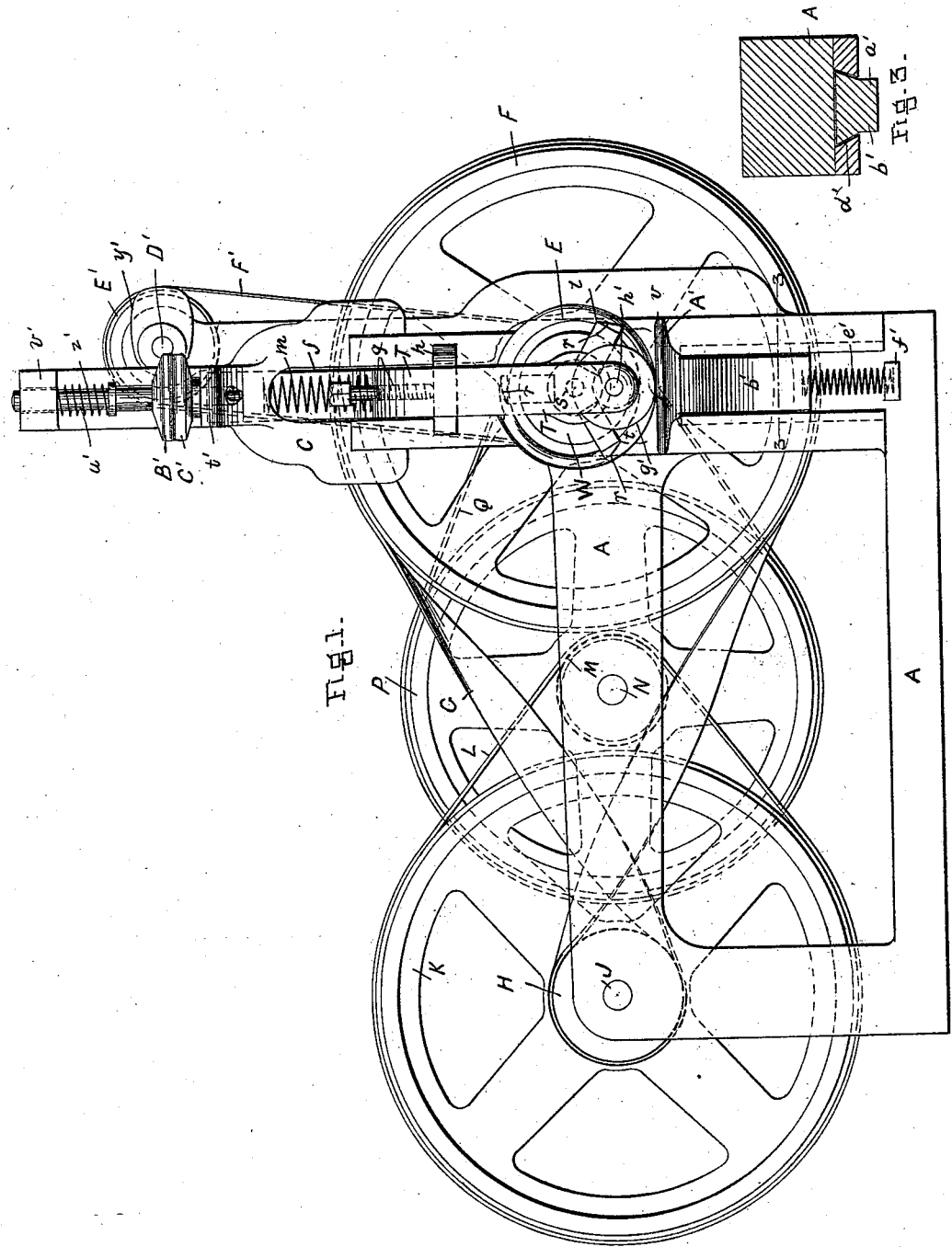
WITNESSES
Percy Bryant
Carrie E. Nichols
INVENTOR
Adolphus La Bonté
per Edwin W. Brown.
Attorney (No Model.) 2 Sheets—Sheet 2.
A. LA BONTÉ.
WELT TURNING AND INSEAM TRIMMING MACHINE.
No. 558,286. Patented Apr. 14, 1896.
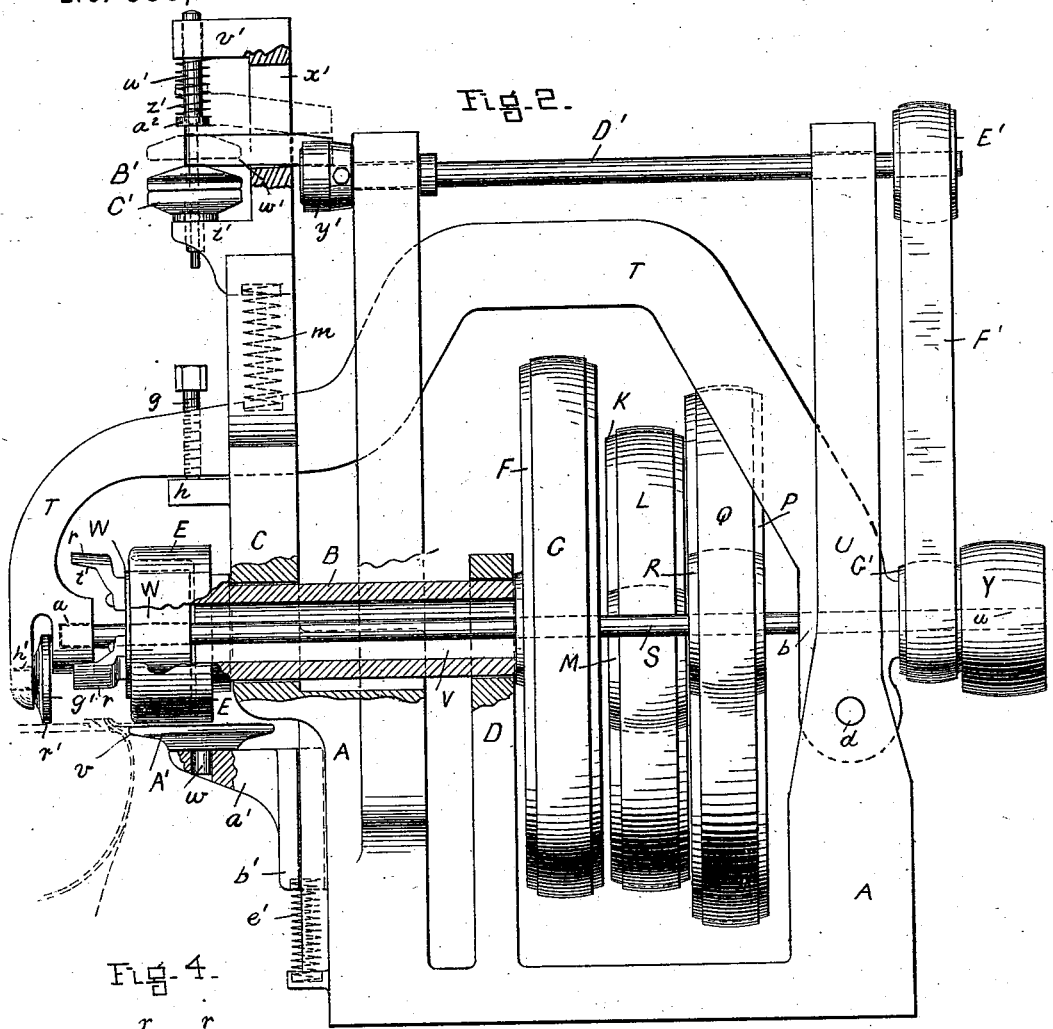
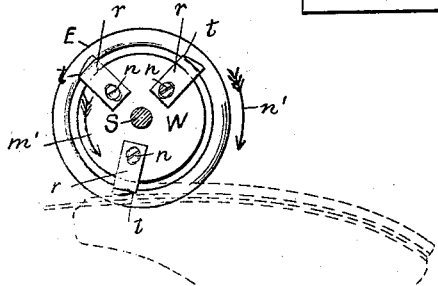
WITNESSES
Percy Bryant
Carrie E. Nichols
INVENTOR
Adolphus La Bonté
per Edwin W. Brown,
Attorney.

UNITED STATES PATENT OFFICE.

ADOLPHUS LÁ BONTÉ, OF BROCKTON, MASSACHUSETTS, ASSIGNOR, BY MESNE ASSIGNMENTS, TO GEORGE H. P. FLAGG, OF BOSTON, MASSACHUSETTS.

WELT-TURNING AND INSEAM-TRIMMING MACHINE.

SPECIFICATION forming part of Letters Patent No. 558,286, dated April 14, 1896.

Application filed January 5, 1889. Serial No. 295,527. (No model.)

*To all whom it may concern:*

Be it known that I, ADOLPHUS LÁ BONTÉ, of Brockton, in the county of Plymouth and State of Massachusetts, have invented certain new and useful Improvements in Welt-Turning and Inseam-Trimming Machines, of which the following is a full, clear, and exact description.

The invention consists in a machine for turning the welt and trimming the inseam of a boot or shoe of certain construction and arrangements of parts, all substantially as hereinafter fully described.

In the accompanying sheet of drawings is illustrated a machine constructed and arranged for operation in accordance with this invention.

Figure 1 is a front view; Fig. 2, a side or end view with parts in section; Fig. 3, a detail section on line 3 3, Fig. 1; and Fig. 4, a detail view to be hereinafter referred to.

In the drawings, A represents a frame on which are supported and carried the various operating parts of this invention.

B is a horizontal shaft turning in bearings in the uprights C and D of the frame and carrying on its outer end a feed-roll E. On the other end of this shaft is a pulley F, connected by a cross-belt G to a small pulley H on another horizontal shaft J, parallel with the shaft B, turning in bearings in the frame A and carrying another larger pulley K, which is connected by a belt L to a small pulley M on another horizontal and parallel shaft N, turning in bearings in the frame A and having a larger pulley P, which is connected by a belt Q with a small pulley R on a horizontal shaft S, turning in bearings $a$ and $b$ and in a separate frame T, which is pivoted by one end, at $d$, to the side of an upright U of the frame and extending upward and over the pulley F and freely through a vertical guiding-opening $f$ in the upright C of the frame A, where it rests, by a screw $g$ screwing down through it, upon an arm or rest $h$ of the upright C and from which it extends over and downward in front of the feed-roll E, having the bearing $a$ for one end of the shaft S, all as shown in Fig. 2 more particularly.

Within the vertical opening $f$ is a spiral spring $m$, bearing against the upper end of the opening and the upper side of the frame T, which spring serves to hold it firmly down by its screw $g$ upon its rest $h$.

The shaft B, carrying the feed-roll E, is hollow, having an opening V from end to end, as well as the roll, through which extends the shaft S, the openings being large enough to allow of up and down movements of the shaft S when the frame T is swung upon its pivot $d$.

Secured to the shaft S, within an open chamber in the feed-roll E, is a head W, to the face of which head is secured, by screws or in any suitable manner, cutters $r$, in the present instance three in number, which have their cutting edges $t$ in a horizontal, or substantially in a horizontal, plane and concentric with the axial center of the shaft S. The shaft S has a pulley Y on its other end, which is the driving-pulley, to be connected by a belt to any suitable driving power, by which all the parts are driven.

Turning the pulley Y in the direction of the arrow $w$, Fig. 2, turns the cutter-head with its cutters in a similar direction, and which should be at a very rapid speed, while the feed-roll E, by its connection therewith by the pulleys and belts and the cross-belt G, is turned in the contrary direction, but with a very slow speed.

Below the feed-roll E is a horizontal circular disk or plate A', having a narrow edge $v$ and turning on a pivot $w$ in a bracket or arm $a'$, which bracket, by its arm $b'$, is arranged to move up and down in a vertical dovetail guideway $d'$ in the frame and held up by a spiral spring $e'$, resting on a portion $f'$ of the frame and bearing against the under side of the arm $b'$ of the bracket.

$g'$ is a vertical wheel or roller turning in a horizontal bearing $h'$ in the outer end of the swinging frame T.

The operation of the machine is as follows: The shaft S having been set in motion, the cutter-head with its cutting-knives $r$ is revolved in the direction of the arrows $m'$, Fig. 4, at a very rapid speed, while the feed-roll E is turned slowly in the contrary direction, as indicated by the arrow $n'$, Fig. 4, the wheel or disk A' bearing up against it by the action of its spring $e'$. The boot to be operated upon, which has its upper and welt secured to the inner sole by stitches, as usual, is then placed in the machine by placing the welt between the feed-roll E and its spring-pressure plate or disk $A'$, the boot bearing by its rand-groove against the edge $v$ of the disk and the middle portion of the inner sole resting and bearing up against the lower edge $r'$ of the roller $g'$, as shown in Fig. 2 in dotted lines, the boot being preferably placed so as to commence at or near the heel of one side of the boot. The boot then being so held by the operator against the cutters is fed along by the movements of the feed-roll E, being also guided and turned and controlled by the operator for the cutting-knives $r$, to cut and trim the inseam edges of the upper channel-lips of the inner sole and welt all around the boot at the same time the feed-roll E and circular spring-pressure plate $A'$ act to turn up the welt into the proper position for it to have the outer sole secured thereto by stitches, when the boot is removed and another put in its place and operated upon as before.

The cutters can be made to trim off more or less of the inseam edges by turning in or out the screw $g$, which raises or lowers, correspondingly, the end of the frame T carrying the cutters, so that the cutters will cut or trim according to their height when operating above the under surface of the feed-roll E, the cutters being held to their work by the action of the spring $m$.

$B'$ $C'$ are two horizontal disks or plates, the lower one, $C'$, of which is arranged to turn on a bracket-arm $t'$ of the upright C, the other one being rigidly connected to an upright rod $u'$, which is disposed in a bearing in an arm $v'$ of the upright and passes loosely through the lower plate $C'$ into a socket in the arm $t'$.

The rod $u'$ has a backwardly-projecting horizontal arm $w'$, passing freely through a vertical guiding-slot $x'$ in the upright C and a sufficient distance beyond to be over and in the path of a cam $y'$, secured to a horizontal shaft $D'$, arranged to turn in bearings in the upper ends of the uprights C U, which shaft has a pulley $E'$, connected by a belt $F'$ to a pulley $G'$ on the driving-shaft S. The rod $u'$ has a spiral spring $z'$, which bears against the under side of the arm $v'$ and a shoulder $a^2$ on the rod, holding the upper plate down on the lower one and returning it thereto if it should be raised and allowed to fall. These disks or plates are for the purpose of hammering or beating out the welt of the boot if needed, and in their operation the welt is placed between the two plates, the cam $y'$ in each revolution of the shaft $D'$ raising the upper plate by its bearing against the under side of the arm $w'$, and as it passes by it the plate falls suddenly upon the welt from the action of its spring $z'$, and thus hammers or beats up the same. It is expected, however, that the feed-roll and its pressure-plate will properly turn the welt; but as at the toe of the boot it is more difficult to do so it might need the action of the hammers to complete it properly.

Having thus described my invention, what I claim is—

In an inseaming-trimming machine, the combination with a hollow feed-roll, and bearing-surfaces for feeding the boot; a hollow shaft for the feed-roll; a cutter-shaft mounted in a swinging frame, and extending through the hollow feed-roll and its hollow shaft; and that swinging frame all organized to operate substantially as described.

In testimony whereof I have hereunto set my hand in the presence of two subscribing witnesses.

ADOLPHUS LÁ BONTÉ.

Witnesses:
EDWIN W. BROWN,
CARRIE E. NICHOLS.